March 31, 1964     H. D. ROE     3,127,199

QUICK DISCONNECT FITTING

Filed Sept. 16, 1960     2 Sheets-Sheet 1

INVENTOR
HOMER DAVIS ROE

BY Curtis, Morris & Safford

ATTORNEYS

March 31, 1964 H. D. ROE 3,127,199
QUICK DISCONNECT FITTING
Filed Sept. 16, 1960 2 Sheets-Sheet 2
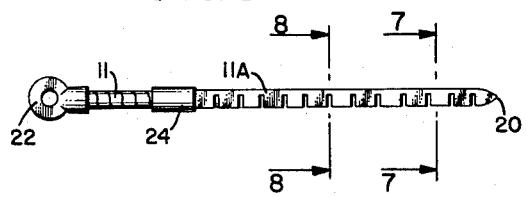
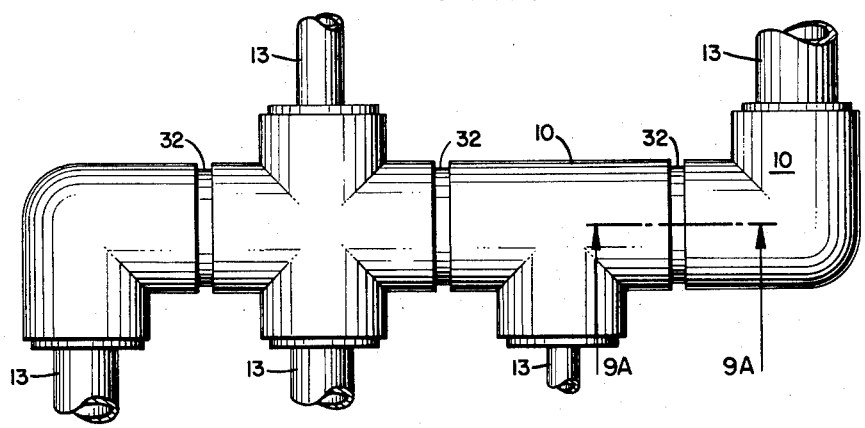
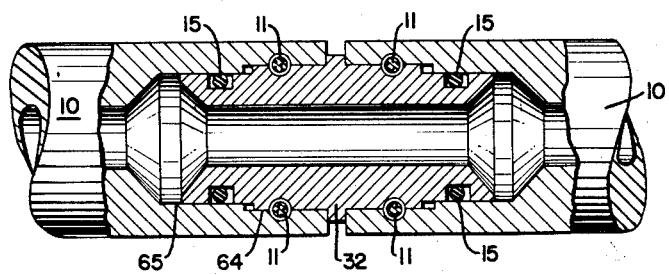
INVENTOR
HOMER DAVIS ROE
BY Curtis, Morris & Safford.
ATTORNEYS 3,127,199
QUICK DISCONNECT FITTING
Homer Davis Roe, 8 Chapin Place, Huntington, N.Y.
Filed Sept. 16, 1960, Ser. No. 56,489
4 Claims. (Cl. 285—165)

This invention relates generally to fittings and more particularly to plumbing fittings.

An object of the invention is to provide a positive quick disconnect means for disassembly of plumbing fittings, although not necessarily limited to plumbing fittings. A further object of this invention is to provide for a plumbing fitting which incorporates the new aforementioned quick disconnect feature to seal fluids and/or gases in a manner which is structurally characterized to obtain among many advantages, the following:

(1) Enables a plumbing or other fitting to be disassembled quickly without the use of tools.

(2) Assures positive locking of fittings when assembled by visual inspection.

(3) Enables the internal portion of the fitting to pivot about the outer housing and still remain positively locked.

(4) Enables the outer housing to be designed small, lightweight and free of irregular appendages which can be machined to achieve low manufacturing costs.

(5) Enables the assembly of various fittings to be most directly coupled for various manifolding arrangements with the minimum of pieces.

(6) Enables rotational freedom of various fittings when directly assembled one fitting to another.

(7) Enables axial movement of tubing in fitting for expansion.

(8) Enables a plurality of line sizes to be used for a single fitting size without additional adapter fittings.

With this and other objects in view, the invention resides in the combinations and arrangements of elements as set forth in the following specification and particularly pointed out in the appended claims.

In the accompanying drawing:

FIGURE 6 is a view of a rectangular sectioned slotted flexible retainer.

FIGURE 7 is a sectioned view of FIGURE 6 taken on line 7—7 of FIGURE 6.

FIGURE 8 is a sectioned view of FIGURE 6 taken on line 8—8 of FIGURE 6.

FIGURE 9 is a view of quick disconnect fittings manifolded together.

FIGURE 9A is a sectioned view of FIGURE 9 taken on line 9A—9A of FIGURE 9.

Referring specifically to drawings, the invention in its present embodiment is particularly adopted for fluid fittings and will be described in conjunction herewith, although it is to be understood that the scope of the invention is not to be limited in this respect as it is capable of use in other environments.

Figure 1:
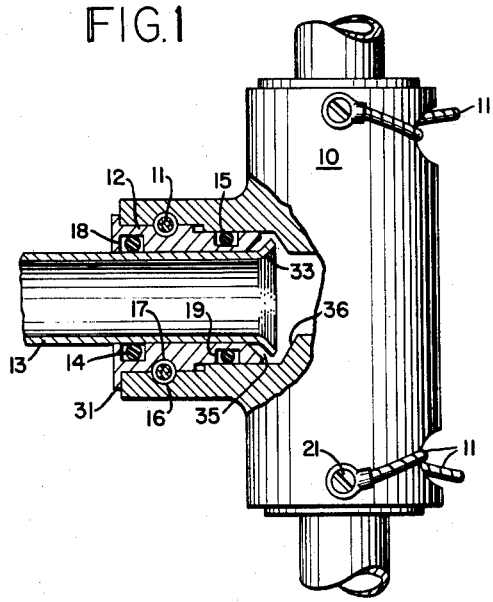
FIGURE 1 is a partially sectioned plan view of a typical fitting assembly embodying this invention.
Figure 3:
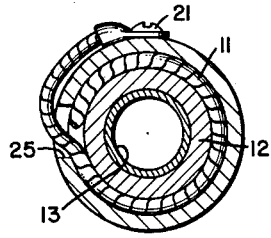
FIGURE 3 is a sectioned view of FIGURE 2 taken on line 3—3 of FIGURE 2 showing flexible retainer installed.
Figure 2:
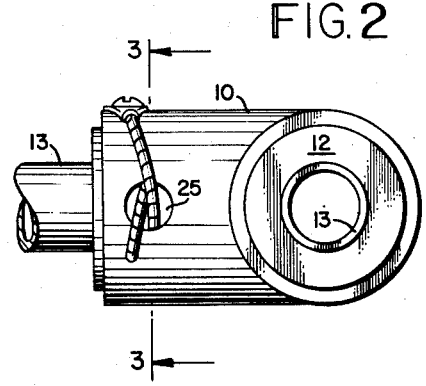
FIGURE 2 is a side view of the fitting assembly showing external parts.

Reference will be had particularly to FIGURE 1, which illustrates the assembled fitting which includes the body 10, sleeve 12, flexible retainer 11 and plumbing tube 13.

Figure 4:
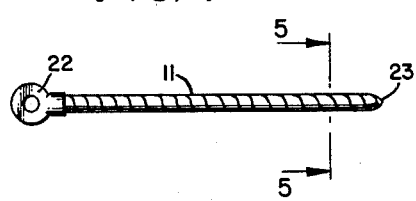
FIGURE 4 is a view of a round sectioned flexible retainer.
Figure 5:
FIGURE 5 is a sectioned view of flexible retainer taken on line 5—5 of FIGURE 4.

Fitting body 10 is internally grooved as a semi-circular sectioned groove 16 or optional rectangular sectioned groove to accept flexible retainer FIGURE 4 round section, or flexible rectangular section retainer FIGURE 6. The bore of fitting 10 allows for free fit of sleeve 12 which has an external semi-circular 17 or rectangular sectioned groove to accept FIGURE 4 flexible round section retainer as shown in FIGURE 5 or flexible rectangular section retainer FIGURE 6 as shown in FIGURES 7 and 8.

The fitting is assembled by installing resilient packing 14 and 15 in grooves 18 and 19. Tube 13 is inserted in sleeve 12 and flared 33 to prevent tube pull out. The tube 13 and sleeve 12 are inserted home in fitting 10 and located by flange 31 integral with sleeve 12. Flexible retainer FIGURE 4 or FIGURE 6 permits an easy slide fit in mating grooves 16 and 17 of body 10 and sleeve 12 respectively in the "home" position of sleeve 12 in body 10 through entry access 25. Round sectioned flexible retainer 11 is tapered and bonded at 23 and rectangular flexible retainer 11A is pointed 20 to permit easy insertion through access 25. Flexible retainer 11 or 11A is attached to body 10 as an assembly by screw 21 and/or riveted thereto to prevent loss. The location of screw 21 attachment with respect to entry access 25 provides securing of retainers 11 or 11A when installed.

Tube 13 is sealed on its outside diameter at flexible seal 14 and sleeve 12 at groove 18 while the outside diameter of the sleeve is sealed to fitting 10 at flexible seal 15 in groove 19. Axial movement of tube 13 is permitted by cavity 35 and the end of the fitting bore 36.

Torsional displacement of tube 13 is permitted since only a slight interference of the resilient seal 14 in groove 18 resists the turning of tube 13 or little mechanical friction exists in flexible retainer 11 in groove 17.

Fitting clusters are interconnected by fitting coupling 32 which permits direct fitting communication without the use of tube 13 between fittings. Only two seals 15 are required to seal between two fittings when using coupling 32. Free torsional rotation is provided each fitting about coupling 32. The bore of fitting 10 is step bored from 64 to 65 diameters as shown in FIGURE 9A to allow resilient seal 15 to pass over edges of groove 16 FIGURE 1 without interference during assembly.

A wide range of tubing sizes 13 can engage in fitting 10 by adapting the differences in size in the tubing bore of sleeve 12.

Flexible retainer FIGURE 4 is made flexible through the use of a plurality of wires 47 braided in a systematic manner.

Optional flexible retainer FIGURE 6 used for higher mechanical loads is solid in section but slotted to permit bending flexibility for installing as shown in FIGURES 7 and 8. A short section of braided retainer 11 is attached to rectangular section 11A by connector 24 to permit easy installation.

What is claimed is:

1. An assembled multi-part quick disconnect fitting for attaching two conduits together, comprising a body portion having a central chamber open at one end and in communication with a first conduit adjacent the opposite end, a sleeve having a portion dimensioned with respect to said one end of said chamber to permit axial insertion of said portion therein, means retaining said sleeve portion within said chamber so constructed and arranged to permit free relative rotation of and prevent axial separation of said sleeve with respect to said chamber, a tube for communication with a second conduit extending into said sleeve and freely rotatable and longitudinally slidably mounted therein, and means on said tube for engaging said sleeve to prevent the withdrawal of said tube from said sleeve while permitting said tube and said sleeve to be inserted in and withdrawn from said chamber as a unit.

2. The combination recited in claim 1, wherein said sleeve is rotatable in both directions and said tube is rotatable in both directions and slidable in both directions and wherein means is provided in said chamber for engaging the end of said tube to limit the movement of said tube into said chamber.

3. The combination recited in claim 1, wherein means is provided for sealing the space between the outer face of said sleeve and the adjacent inner face of said chamber and for sealing the space between the outer face of said tube and the inner face of said sleeve, while permitting said sleeve to freely rotate within said chamber and said tube to freely rotate and longitudinally move in said sleeve.

4. The combination recited in claim 1, wherein the end of said sleeve within said chamber is spaced from the adjacent end of said chamber, and wherein the end of said tube within said chamber is provided with a flange located in said space which flange is of greater diameter than the inside diameter of said sleeve.

References Cited in the file of this patent

UNITED STATES PATENTS

| | | |
|---|---|---|
| 2,219,752 | Rohr | Oct. 29, 1940 |
| 2,389,825 | Smith | Nov. 27, 1945 |
| 2,403,368 | Howard | July 2, 1946 |
| 2,450,581 | Couty | Oct. 5, 1948 |
| 2,458,714 | Mahoney | Jan. 11, 1949 |
| 2,652,895 | Arrowood | Sept. 22, 1953 |
| 2,749,151 | Lyons | June 5, 1956 |
| 2,918,313 | Lazar | Dec. 22, 1959 |

FOREIGN PATENTS

| | | |
|---|---|---|
| 472,773 | Great Britain | Sept. 30, 1937 |
| 745,526 | Great Britain | Feb. 29, 1956 |
| 325,021 | Switzerland | Dec. 14, 1957 |